United States Patent [19]

Cleland

[11] 3,882,401

[45] May 6, 1975

[54] ILLUMINATING ARRANGEMENT FOR CHANNEL OR STATION SELECTION INDICATOR OF A RECEIVER OF THE STANDBY TYPE

[75] Inventor: David E. Cleland, Waterloo, Ontario, Canada

[73] Assignee: Electrohome Limited, Kitchener, Ontario, Canada

[22] Filed: Mar. 4, 1974

[21] Appl. No.: 447,860

[52] U.S. Cl. .................................. 325/492; 328/260

[51] Int. Cl. ............................................ H05b 39/00

[58] Field of Search .................... 325/455, 492, 494; 178/7.5 R, 7.3 R; 315/8, 94, 101, 96; 328/260, 270

[56] References Cited

UNITED STATES PATENTS

| | | | |
|---|---|---|---|
| 3,339,019 | 8/1967 | Knorr et al. | 328/270 |
| 3,339,105 | 8/1967 | Busse | 328/260 |

FOREIGN PATENTS OR APPLICATIONS

| | | | |
|---|---|---|---|
| 707,060 | 3/1965 | Canada | 315/101 |

*Primary Examiner*—Benedict V. Safourek
*Attorney, Agent, or Firm*—Sim & McBurney

[57] ABSTRACT

A system is disclosed for controlling the illumination of the channel or station selection indicator of a receiver of the standby type. The receiver includes at least one tube having a cathode filament. During standby operation one half power is supplied to this filament via a diode. During normal operation the diode is shorted out, so that full power is supplied to the filament. The channel or station selection indicator lamp is connected in series with another diode, the series circuit being connected across the cathode filament and the two diodes being connected with reverse polarity so that flow of current through the lamp during standby operation is inhibited but is permitted during normal operation of the receiver.

5 Claims, 1 Drawing Figure

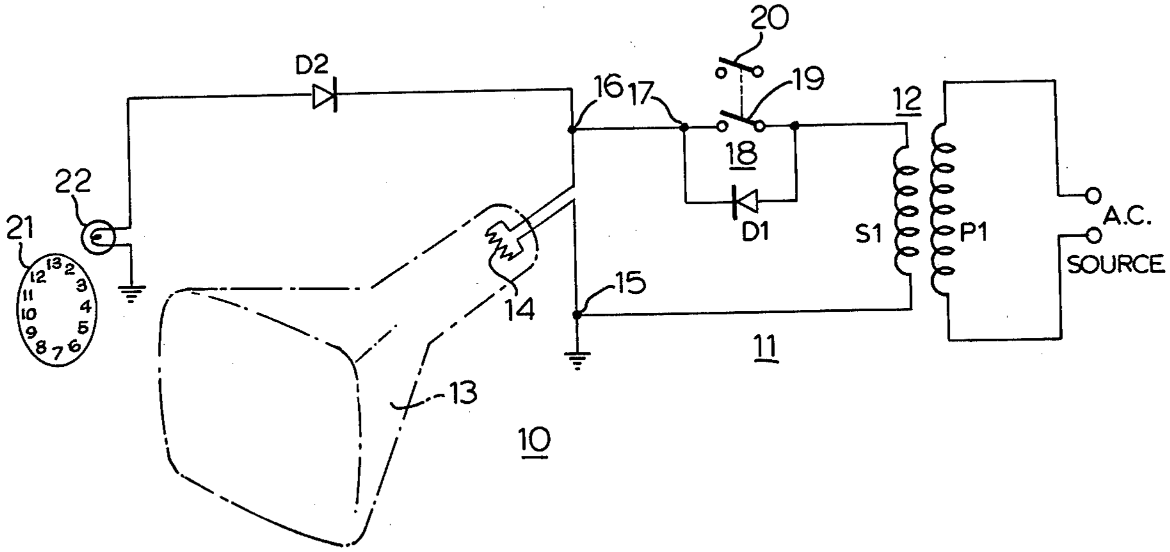
20
D2
16
17
19
12
18
22
D1
A.C.
21
S1
P1
SOURCE
14
15
11
13
10

ILLUMINATING ARRANGEMENT FOR CHANNEL OR STATION SELECTION INDICATOR OF A RECEIVER OF THE STANDBY TYPE

This invention relates to systems for controlling the illumination of the channel or station selection indicator of a receiver of the "instant-on" or standby type.

So called instant-on television receivers have been sold for a number of years. In receivers of this type the filaments of any "tubes" in the receiver are supplied with one half normal power when the receiver is off, thus keeping the filaments warm. When the receiver is turned on, full power is supplied to the filaments and the receiver becomes operational virtually immediately. This is in contrast to a receiver not having instant-on capability which requires a half a minute or so to "warm up" before becoming operational.

In a television receiver there is a channel selection indicator, which may be a disc associated with the receiver tuner or, alternatively, push buttons. This indicator normally is illuminated to provide a visual indication of the channel to which the receiver is tuned. In a television receiver not provided with instant-on, the lamp which illuminates the channel selection indicator is turned on and off with the receiver. In an instant-on receiver, however, this cannot be so simply achieved, and it has been common practise to employ a switch ganged to the on-off switch of the receiver to turn this lamp off when the receiver is off but with half power being applied to the tube filaments, and on when the receiver is on.

SUMMARY OF THE INVENTION

In accordance with this invention a diode is substituted for the aforementioned switch, thereby eliminating a mechanical component that is subject to mechanical failure and also effecting a cost reduction. This diode is connected in circuit with the lamp and back to back with the instant-on diode and thus prevents current from flowing through the lamp when the receiver is off, i.e., in standby condition.

BRIEF DESCRIPTION OF THE DRAWING

The single FIGURE appended hereto is a circuit diagram showing the preferred embodiment of the invention in the environment of a television receiver.

DESCRIPTION OF THE PREFERRED EMBODIMENT

Referring to the drawing, a conventional television receiver 10 is provided with a conventional instant-on power supply 11. The power supply includes a transformer 12 having a primary winding P1 and a secondary winding S1. One terminal 15 of the filament 14 of the cathode ray tube 13 of the receiver is grounded and also is connected to one terminal of secondary winding S1. The other terminal 16 of filament 14 is connected to the fixed contact 17 of a switch 18 which has a movable contact 19 that is connected to the other terminal of secondary winding S1. Connected in parallel with or shunting switch 18 is a diode D1.

Primary winding P1 is connected to any suitable AC source, say, at 120 volts. The primary voltage is transformed to a suitable voltage, e.g. 6.3 volts, for filament 14. When the receiver is off, contact 19 is in the position shown in the Figure. Diode D1 functions as a half-wave rectifier and half power is supplied to filament 14.

When the receiver is turned on, switch 18 is closed shorting out diode D1 so that full power is supplied to filament 14. It will be understood, of course, that if the receiver employs other tubes, rather than transistors, their filaments may be connected in parallel with filament 14 or otherwise as their voltage requirements dictate. In other words, filament 14 may be considered to represent a filament load. It also will be understood that switch 18 is the on-off switch of the receiver. Ganged to movable contact 19 is another movable contact 20 that controls the $B^+$ or $B^-$ part (not shown) of the power supply. Other conventional parts of the receiver-tuner, video section, audio section also are not shown as they are not relevant to the invention.

The channel selection indicator of the receiver is shown at 21 and is illuminated by a lamp 22. Commonly lamp 22 in series with another movable contact ganged to movable contact 19 has been connected across filament 14. In accordance with this invention the former movable contact is replaced with a diode D2 that is connected back to back, i.e. cathode to cathode or anode to anode with diode D1. In other words, diodes D1 and D2 are connected with reverse polarity. Thus, when the receiver is off, the half-wave pulses from diode D1 are blocked by diode D2 and lamp 22 remains off. When the receiver is turned on by closing switch 18, diode D2 serves as a half-wave rectifier and lamp 22 illuminates.

While this invention has been described in the environment of a television receiver, those skilled in the art will appreciate that it may be used in any other type of receiver provided with an instant-on capability.

What I claim as my invention is:

1. In a receiver of the standby type having at least one tube including a cathode filament, a lamp for indicating whether the receiver is on or off, means to be connected to an AC source and including a first diode connected in circuit with said filament for supplying reduced power to said filament during standby operation, a switch connected in shunt with said first diode for bypassing said first diode when said switch is closed to supply full power to said filament during normal operation, and a DC power supply the improvement comprising a second diode connected in a series circuit with said lamp, said series circuit being connected in shunt with said filament and being independent of said DC power supply, said first and second diodes being connected with reverse polarity to inhibit flow of current through said lamp during standby operation but permitting current to flow through said lamp during normal operation.

2. The combination according to claim 1 wherein said receiver includes a channel or station selection indicator, said lamp being arranged to illuminate said indicator.

3. The combination according to claim 1 wherein said means to be connected to an AC source includes a transformer having primary and secondary windings.

4. The combination according to claim 3 wherein said first diode and said filament are connected in series with each other across said secondary winding and said first and second diodes and said lamp are connected in series with each other across said secondary winding.

5. The combination according to claim 4 wherein said receiver is a television receiver and includes a channel selection indicator, said lamp being arranged to illuminate said indicator.

* * * * *